(12) United States Patent
Claes

(10) Patent No.: US 11,293,558 B2
(45) Date of Patent: Apr. 5, 2022

(54) CHECK VALVE ASSEMBLY

(71) Applicant: Atlas Copco Airpower, Naamloze Vennootschap, Wilrijk (BE)

(72) Inventor: Erwin Louis Annie Claes, Wilrijk (BE)

(73) Assignee: ATLAS COPCO AIRPOWER, NAAMLOZE VENNOOTSCHAP, Wilrijk (BE)

( * ) Notice: Subject to any disclaimer, the term of this patent is extended or adjusted under 35 U.S.C. 154(b) by 97 days.

(21) Appl. No.: 16/313,987

(22) PCT Filed: Jul. 17, 2017

(86) PCT No.: PCT/IB2017/054301
§ 371 (c)(1),
(2) Date: Dec. 28, 2018

(87) PCT Pub. No.: WO2018/015866
PCT Pub. Date: Jan. 25, 2018

(65) Prior Publication Data
US 2019/0316694 A1   Oct. 17, 2019

Related U.S. Application Data

(60) Provisional application No. 62/364,352, filed on Jul. 20, 2016.

(30) Foreign Application Priority Data

Sep. 21, 2016  (BE) .................................. 2016/5708

(51) Int. Cl.
*F16K 15/03* (2006.01)
*F04B 39/10* (2006.01)
(Continued)

(52) U.S. Cl.
CPC .............. *F16K 15/03* (2013.01); *F04B 39/10* (2013.01); *F04B 53/104* (2013.01); *F04C 25/02* (2013.01);
(Continued)

(58) Field of Classification Search
CPC ........ F16K 15/03; F04B 39/10; F04B 53/104; F04C 25/02; Y10T 137/7854–7857; Y10T 137/7898–7903
(Continued)

(56) References Cited

U.S. PATENT DOCUMENTS 2,949,931 A * 8/1960 Ruppright ............... F16K 15/02
  137/528
3,106,220 A * 10/1963 Hose ....................... F16K 15/03
  137/514
(Continued)

FOREIGN PATENT DOCUMENTS

CN    2835743 Y    11/2006
CN    2842015 Y    11/2006
(Continued)

OTHER PUBLICATIONS

International Search Report in related PCT Application No. PCT/IB2017/054301, dated Nov. 2, 2017.
(Continued)

*Primary Examiner* — Craig M Schneider
*Assistant Examiner* — Frederick D Soski
(74) *Attorney, Agent, or Firm* — Bacon & Thomas, PLLC

(57) ABSTRACT

A check valve assembly for a compressor or a vacuum pump includes a valve body adapted to receive a valve plate pivoting between a first open position and a second closed position. The valve body is connected to a discharge port of a compressor unit or to the intake port of a vacuum pump. A second fluid conduit is attachable to the valve body and is (Continued)

connected to an external network. The assembly includes a shaft and at least one bearing for connecting the valve plate to the valve body. The valve plate includes an elongated area having a hollow tube through which the shaft is inserted for rotatably mounting the valve plate. At least one bearing is positioned on the shaft within the hollow tube.

15 Claims, 6 Drawing Sheets

(51) Int. Cl.
    *F04B 53/10*     (2006.01)
    *F04C 25/02*     (2006.01)
    *F04C 29/12*     (2006.01)

(52) U.S. Cl.
    CPC ....... *F04C 29/126* (2013.01); *Y10T 137/7898* (2015.04)

(58) Field of Classification Search
    USPC .......................... 251/149.2, 149.9, 147, 299
    See application file for complete search history.

(56) References Cited

U.S. PATENT DOCUMENTS

| | | | | |
|---|---|---|---|---|
| 3,522,929 A * | 8/1970 | De Simone | ........... | F16K 1/2007 251/298 |
| 3,875,963 A * | 4/1975 | Buck | ........... | F16K 15/03 137/527.8 |
| 4,128,111 A * | 12/1978 | Hansen | ........... | F16K 15/03 137/515.7 |
| 4,308,894 A * | 1/1982 | Carpentier | ........... | F16K 15/03 137/630.15 |
| 4,407,325 A * | 10/1983 | Cherniak | ........... | F16K 15/033 137/514 |
| 4,427,025 A * | 1/1984 | Prince | ........... | F16K 15/033 137/527 |
| 5,040,002 A * | 8/1991 | Pollacek | ........... | B41J 2/175 347/87 |
| 5,056,548 A * | 10/1991 | Mills | ........... | F16K 15/03 137/15.18 |
| 5,203,365 A * | 4/1993 | Velie | ........... | F16K 17/34 137/454.2 |
| 5,213,306 A * | 5/1993 | Lageder | ........... | F16K 15/03 251/298 |
| 5,671,769 A * | 9/1997 | Booth | ........... | F16K 15/03 137/15.18 |
| 7,784,489 B2 * | 8/2010 | Paulin | ........... | F04D 9/008 137/527.2 |
| 9,320,882 B2 * | 4/2016 | McDaniel | ........... | A61F 5/4404 |
| 2002/0189687 A1 * | 12/2002 | Linthorst | ........... | F16K 15/026 137/522 |
| 2004/0079911 A1 * | 4/2004 | Glover | ........... | F16K 31/084 251/65 |
| 2006/0102233 A1 * | 5/2006 | Scaramucci | ........... | F16K 15/033 137/527.4 |
| 2008/0308159 A1 * | 12/2008 | Stunkard | ........... | F16K 15/03 137/315.33 |
| 2012/0180881 A1 * | 7/2012 | Humphreys | ........ | F28D 20/0034 137/561 R |
| 2013/0221255 A1 * | 8/2013 | Ferguson | ........... | F16K 31/0651 251/129.15 |
| 2016/0153565 A1 * | 6/2016 | Poddar | ........... | E03C 1/298 251/12 |
| 2017/0074421 A1 | 3/2017 | Yang | | |
| 2018/0209555 A1 * | 7/2018 | Fink | ........... | F16K 15/03 |

FOREIGN PATENT DOCUMENTS

| | | |
|---|---|---|
| CN | 201281148 Y | 7/2009 |
| CN | 203335948 U | 12/2013 |
| CN | 104564689 A | 4/2015 |
| CN | 204961923 U | 1/2016 |
| DE | 3829856 A1 | 3/1990 |
| EP | 0233445 A1 | 8/1987 |
| FR | 2858369 A1 | 2/2005 |
| GB | 175787 | 1/1922 |
| RU | 2177574 C2 | 1/2000 |
| RU | 2187030 C2 | 7/2000 |
| WO | 2011047437 A1 | 4/2011 |
| WO | 2015178544 A1 | 11/2015 |

OTHER PUBLICATIONS

Written Opinion in related PCT Application No. PCT/IB2017/054301, dated Nov. 2, 2017.

Second Written Opinion in related PCT Application No. PCT/IB2017/054301, dated Jun. 25, 2018.

International Preliminary Report on Patentability in related PCT Application No. PCT/IB2017/054301, dated Oct. 31, 2018.

\* cited by examiner

CHECK VALVE ASSEMBLY

BACKGROUND OF THE INVENTION

This invention relates to a check valve assembly configured to be mounted at the interface between a compressor unit or a vacuum pump and an external network, for preventing a fluid flow in the upstream direction, the check valve assembly comprising: a valve body adapted to receive a valve plate, said valve plate being adapted to pivot between a first open position in which fluid can flow through said check valve and a second closed position in which fluid cannot flow through said check valve; said valve body being adapted to be connected to a discharge port of a compressor unit or to the intake port of a vacuum pump through a first fluid conduit; a second fluid conduit attachable to the valve body, said second fluid conduit being adapted to be connected to an external network; a shaft and at least one bearing for connecting the valve plate to the valve body.

Check valves for controlling the flow of fluid on a fluid conduit are currently used.

One example can be found in RU 2,177,574, having Novikov Mikhail Ivanovich and Surskij Aleksandr Ivanovich as applicants. The document discloses a valve having a housing and a valve disk, whereby the valve disk is mounted within said housing through a shaft onto which a number of three bearings are placed, one end of said shaft being mounted on an actuator while the other end of the shaft is being mounted on the body of the valve through a dumper.

One drawback of the valve disclosed in the above identified patent document is the complex structure necessary for mounting the valve disk on the valve body.

Another drawback is the risk of breakage during the functioning of said valve due to the improper reinforcement of the shaft along its length.

Other drawbacks consist of the manufacturing and maintenance costs afferent to such a valve due to the numerous complex and non-standard components used throughout its layout.

Another example of such valve can be found in RU 2,187,030, having OAO KALUZH TURBINNYJ ZD as applicant.

For the valve disclosed therein, the turning plate is mounted to the housing through a rotary shaft, a lever and a rotary hydraulic damper.

One of the drawbacks of such a valve is the complex design, because of which the manufacturing and maintenance processes become burdensome and costly. A further drawback is the risk of experiencing breakages at the level of the connection between the turning plate and the housing due to an improper support of the rotary shaft.

SUMMARY OF THE INVENTION

Taking the above mentioned drawbacks into account, it is an object of the present invention to provide a valve with a stronger and more reliable connection between the valve plate and the valve body.

A further object of the present invention is to provide a valve with a long life span, having a simple design with a simple and fast assembly, and at the same time having low maintenance and manufacturing costs.

Yet another object of the present invention is to provide a valve that would eliminate the risk of experiencing unwanted displacements during functioning.

Further, it is desired to provide a valve that would eliminate the risk of experiencing a back rotation in the compressor element due to fluctuations in the demanded pressure.

The present invention solves at least one of the above and/or other problems by providing a check valve assembly configured to be mounted at the interface between a compressor unit or a vacuum pump and an external network, for preventing a fluid flow in the upstream direction, the check valve assembly comprising:

a valve body adapted to receive a valve plate, said valve plate being adapted to pivot between a first open position in which fluid can flow through said check valve and a second closed position in which fluid cannot flow through said check valve;

said valve body being adapted to be connected to a discharge port of a compressor unit or to the intake port of a vacuum pump through a first fluid conduit;

a second fluid conduit attachable to the valve body, said second fluid conduit being adapted to be connected to an external network;

a shaft and at least one bearing for connecting the valve plate to the valve body;

whereby the valve plate comprises an elongated area having a hollow tube through which the shaft is inserted for rotatably mounting said valve plate in the valve body and, in that, said at least one bearing is positioned on said shaft and within said hollow tube.

Indeed, because the valve plate comprises an elongated area having a hollow tube through which the shaft is inserted, a much better and robust support for the shaft is provided. Because the assembly comprises at least one bearing mounted within said hollow tube, the robustness is even more increased and, consequently, the risks of experiencing breakages at the level of the connection between the valve plate and the valve body are significantly reduced, if not even eliminated.

Furthermore, both the lifetime of the valve assembly and the period after which the valve assembly would require a maintenance process are increased significantly.

By using such a structure for the valve assembly and incorporating such standard components, the manufacturing and maintenance processes become very easy and cost effective. Moreover, the valve plate and the valve body can be made from casted components and the valve assembly according to the present invention uses only a very limited number of components and has a simple layout.

Test have shown that, because of the structure of the check valve according to the present invention, the valve plate reacts very fast to sudden changes in pressure at the level of the external network and pivots into a second closed position, avoiding a back rotation type of movement for the element of the compressor unit or of the vacuum pump.

Furthermore, in case the check valve is mounted in a compressor unit, said check valve avoids that compressed air flows from the external network back into the compressor unit, preventing damages to the compressor element.

Similarly, if such a check valve is mounted in a vacuum pump, said check valve avoids that air from the vacuum pump flows into the external network, preventing damages to the vacuum pump element.

In the context of the present invention the compressor unit should be understood as the complete compressor installation, including the compressor element, all the typical connection pipes and valves, the compressor unit housing and possibly the motor driving the compressor element.

Similarly, the vacuum pump should be understood as the complete vacuum pump installation, including the vacuum element, all the typical connection pipes and valves, the vacuum pump housing and possibly the motor driving the vacuum pump element.

In the context of the present invention, the compressor element should be understood as compressor element casing in which the compression process takes place by means of a rotor or through a reciprocating movement.

Similarly, the vacuum element should be understood as the vacuum element casing in which the vacuum process takes place by means of a rotor or through a reciprocating movement.

In some cases, a more complex compressor installation can be created in order to meet the demand at the external network. Accordingly, a number of compressor units can be mounted in parallel and provide compressed air to the external network, such compressor units having the same pressure and flow characteristics, or having different pressure and flow characteristics.

Preferably, a check valve according to the present invention is mounted on the discharge port of each compressor unit.

When such compressor installations are employed, a typical situation can be the one in which the pressure measured within the second fluid conduit can reach higher values than the one measured within the first fluid conduit because of, for example, a compressor unit of a higher pressure and flow characteristic would function in parallel with a compressor unit having a lower pressure and flow characteristic, or because one compressor unit would function and another one would be in stand-by.

If a check valve according to the present invention would not be used within such a system, compressed air would be allowed to flow from the external network into the compressor unit having a lower pressure value within the first fluid conduit, reaching a dangerous situation which can damage the compressor element and other components part of the compressor unit, such as different valves or connections.

It should be understood that a similar effect of a check valve according to the present invention is achieved within a vacuum pump, the only difference is that the check valve is mounted at the intake port of the vacuum pump and air is now allowed to flow from the vacuum element into the external network.

Moreover, because of using a check valve according to the present invention, the motor driving the compressor element or the vacuum element needs less power to start said compressor unit or vacuum pump. Accordingly, the check valve of the present invention is in a second closed position before the compressor unit or vacuum pump is started.

Consequently, the pressure measured within the first fluid conduit is approximately equal to the pressure measured at the inlet of the compressor unit or vacuum pump, allowing the motor to generate less power for starting said compressor unit or vacuum pump. At the same time, a much higher efficiency is achieved, prolonging the lifetime of the motor, and allowing a user of such compressor unit or vacuum pump to reduce energy costs as well as maintenance costs.

If a check valve according to the present invention would not be used, the pressure measured within the first fluid conduit would have the same value as the pressure value measured within the external network, which can be much higher than the pressure value measured at the inlet of the compressor unit or vacuum pump. Consequently, the motor driving the compressor element or vacuum pump would need to generate more power during the starting sequence.

In a preferred embodiment according to the present invention, in case such check valve is mounted within a compressor unit, a blow-off valve can further be mounted within the first fluid conduit, between the compressor unit and the check valve. Said blow-off valve allowing the fluid present within the compressor unit to be vented to the atmosphere once the compressor unit is brought in an unloaded state or is switched off. Because in such a situation, the check valve will be brought into a second closed position, compressed air from the external network is not allowed to reach said blow-off valve and be vented to the atmosphere, maintaining a very high efficiency of the compressor unit at all times.

The present invention is further directed to the use of a check valve according to the present invention in controlling the flow of fluid at the discharge of a compressor unit or at the intake port of a vacuum pump.

BRIEF DESCRIPTION OF THE DRAWINGS

With the intention of better showing the characteristics of the invention, some preferred configurations according to the present invention are described hereinafter by way of an example, without any limiting nature, with reference to the accompanying drawings, wherein.

DETAILED DESCRIPTION OF THE INVENTION

Figure 1:
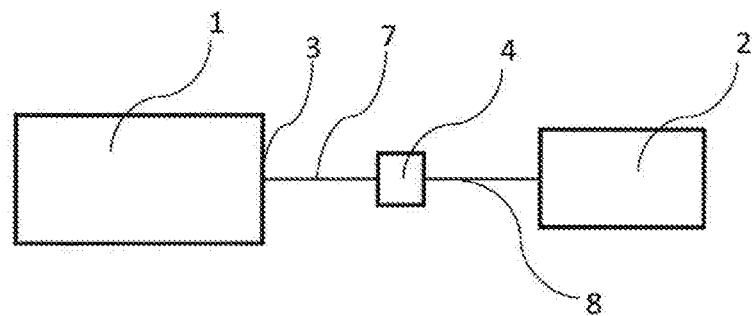
FIG. 1 schematically represents a compressed air system according to an embodiment of the present invention.

FIG. 1 illustrates a compressed air system whereby a compressor unit 1 provides compressed air to an external network 2. The flow of fluid at a discharge port 3 of the compressor unit 1 is controlled by means of check valve assembly 4.

Figure 11:
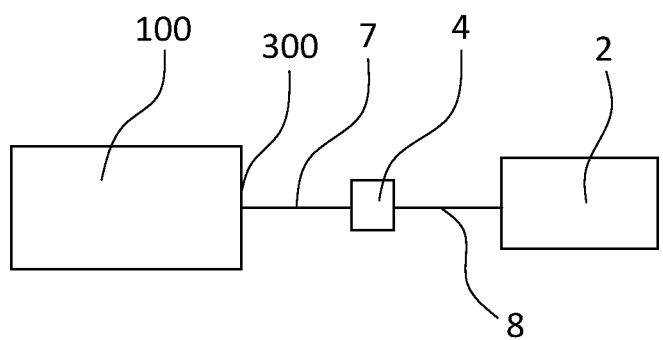
FIG. 11 schematically represents a vacuum system according to an embodiment of the present invention.

Similarly, FIG. 11 illustrates a vacuum pump system whereby a vacuum pump 100 provides vacuum to an external network 2. The flow of fluid at the intake port 300 of the vacuum pump 100 is controlled by means of check valve assembly 4.

Figure 2:
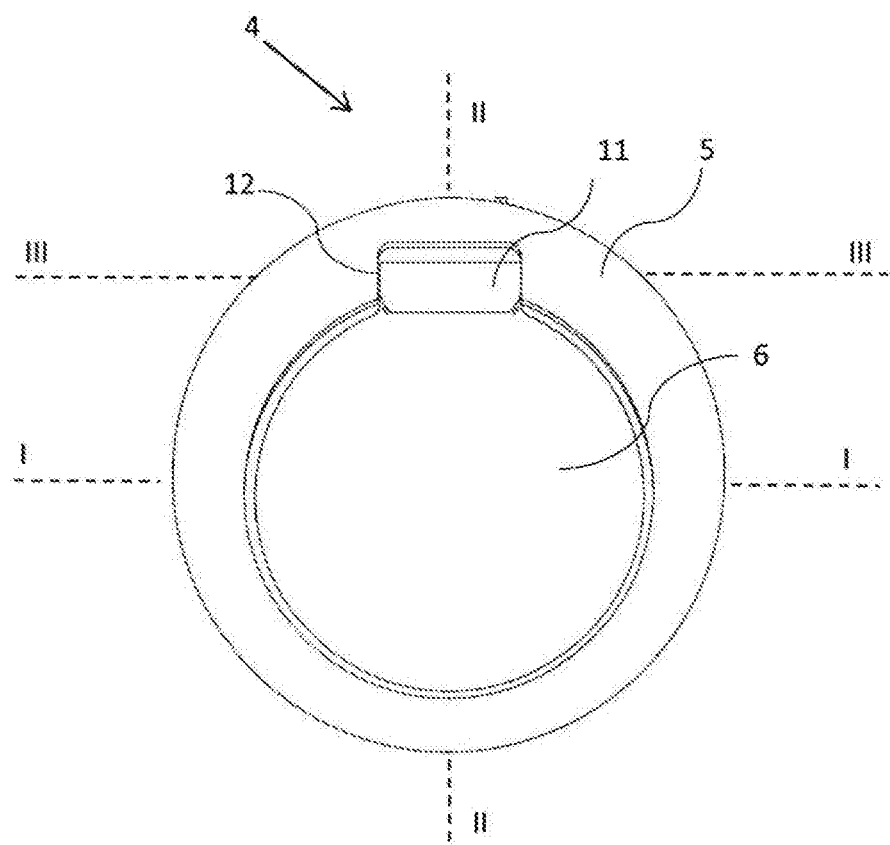
FIG. 2 schematically represents a top view of a check valve assembly according to one embodiment of the present invention.
Figure 3:
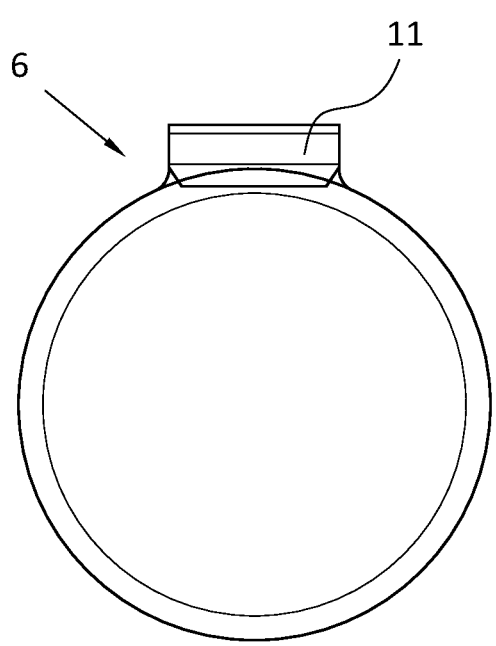
FIG. 3 schematically represents a valve plate according to an embodiment of the present invention.
Figure 4:
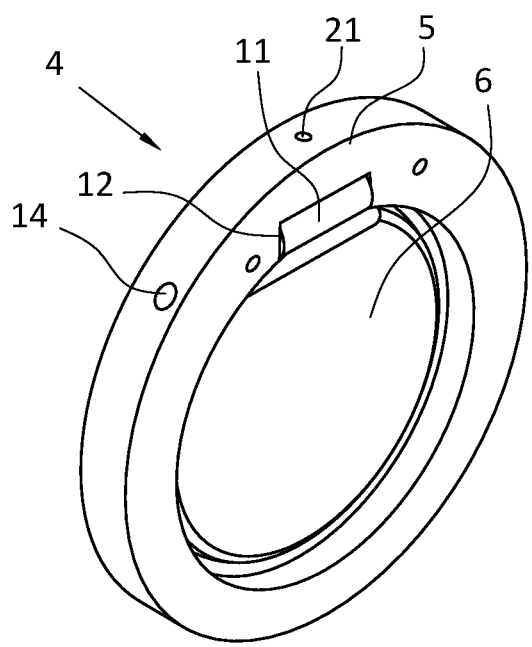
FIG. 4 schematically represents a slightly rotated 3D back view of a check valve assembly according to an embodiment of the present invention.

The check valve assembly 4 comprises a valve body 5 receiving a valve plate 6, as illustrated at least in FIG. 2.

Figure 6:
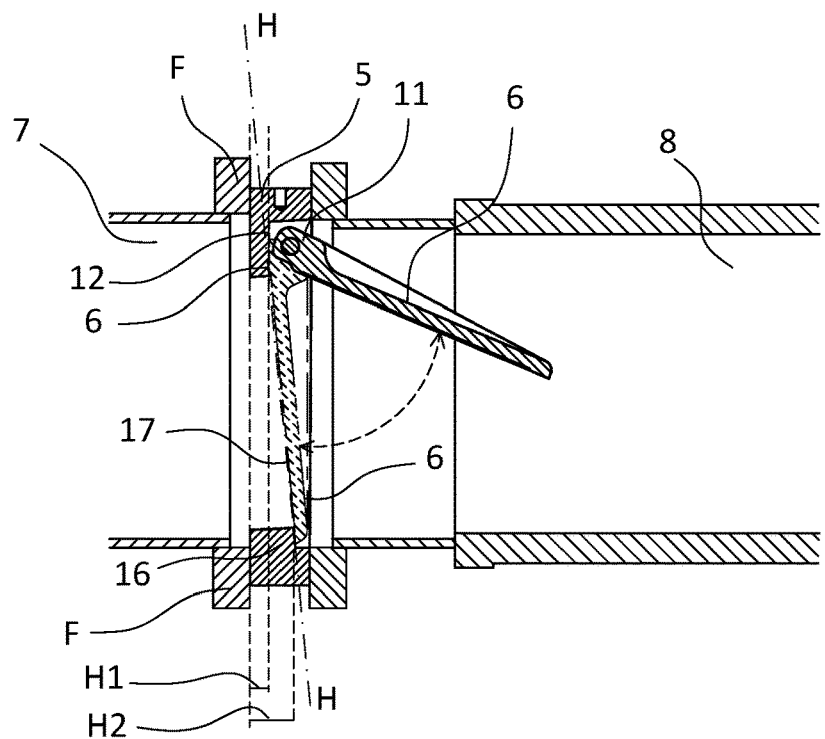
FIG. 6 schematically represents a cross-section of a check valve assembly mounted within a fluid conduit according to an embodiment of the present invention.
Figure 12:
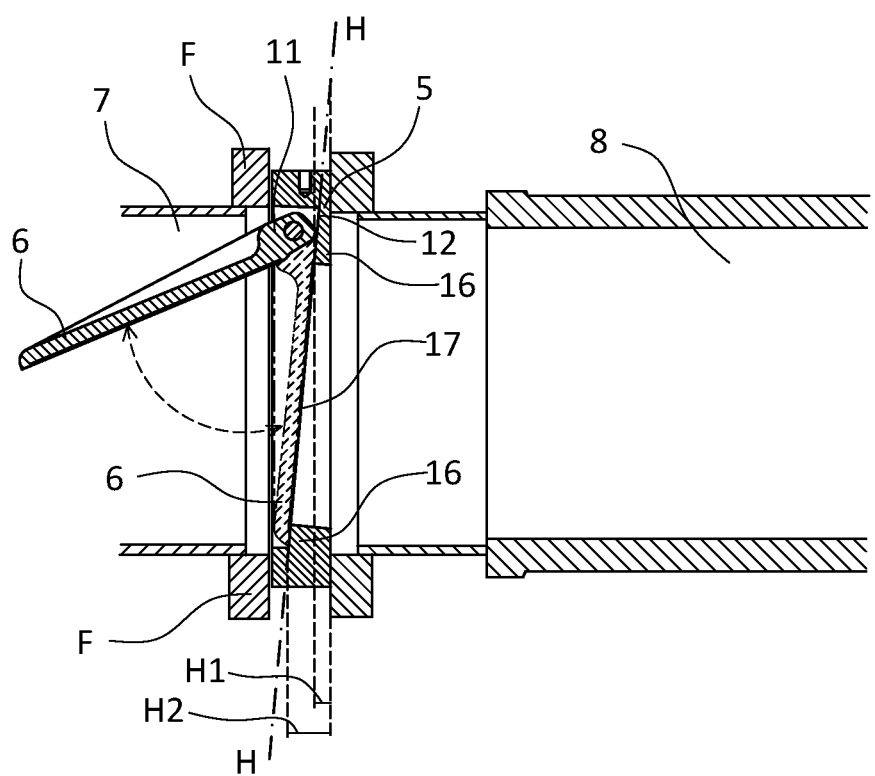
FIG. 12 schematically represents a cross-section of a check valve assembly mounted within a fluid conduit of a vacuum pump according to an embodiment of the present invention.

The valve plate 6 is being adapted to pivot between a first open position in which fluid can flow through said check valve 4 and a second closed position in which fluid cannot flow through said check valve 4, as illustrated in FIG. 6 and FIG. 12.

In the case of a compressor unit 1, the valve body 5 is preferably mounted to a discharge port 3 of said compressor unit 1 through a first fluid conduit 7. Further, a second fluid conduit 8 is attachable to the valve body 5, on the opposite side from the first fluid conduit 7, said second fluid conduit 8 creating a space in which the valve plate 6 pivots freely between the first open position and the second closed position. Said second fluid conduit 8 being adapted to be connected to an external network 2.

In the case of a vacuum pump 100, the valve body 5 is preferably mounted to an intake port 300 of said vacuum pump 100 through a first fluid conduit 7, as illustrated in FIG. 11, said first fluid conduit 7 creating a space in which the valve plate 6 pivots freely between the first open position and the second closed position, as can be seen in FIG. 12.

A second fluid conduit 8 is attachable to the valve body, on the opposite side from the first fluid conduit 7, said second fluid conduit 8 being adapted to be connected to an external network 2.

Returning for example to FIG. 5, it can be seen that the check valve assembly 4 preferably further comprises a shaft 9 and at least one bearing 10 for connecting the valve plate to the valve body 5.

Preferably, for a stronger connection between the valve plate 6 and the valve body 5, the valve plate 6 comprises an elongated area 11 having a hollow tube through which the shaft 9 is inserted for rotatably mounting said valve plate 6 in the valve body 5. Because the shaft 9 is completely inserted through said hollow tube, said shaft 9 is being reinforced on the entire length of the tube, and no week structural points are created.

For an even more robust structure, the at least one bearing 10 is positioned on said shaft 9 and within said hollow tube.

By adopting such a robust layout for connecting the valve plate 6 to the valve body 5, the lifetime of the check valve assembly 4 is significantly increased, and the check valve assembly 4 is much more reliable when compared to the currently used ones.

Because the check valve assembly 4 is mounted between the first fluid conduit 7 and the second fluid conduit 8, a structural limitation is automatically created by such flow conduits, 7 and 8, and the valve cannot come loose during the functioning period.

Even though the layout of the check valve assembly according to the present invention is simple, a very robust and durable product is obtained.

Because the valve body 5 and the valve plate 6 can be manufactured from casted metal, no structural week point is encountered throughout their surface.

Even though for the embodiments shown in the accompanying drawings, the valve plate 6 is illustrated as being relatively circular, while excluding the elongated area 11, in the context of the present invention it should be understood that such a plate can be made of any shape, such as for example and not limiting to: oval, square, rectangular, rhomboid, or any other desired shape, depending on the application such check valve assembly 4 is designed for.

At the same time, in the context of the present invention, the valve body 5 should not be limited to a circular layout, and it should be understood that any shape can be used, without departing from the scope of the invention, such as for example and not limiting to: oval, square, rectangular, or any other desired shape.

Figure 5:
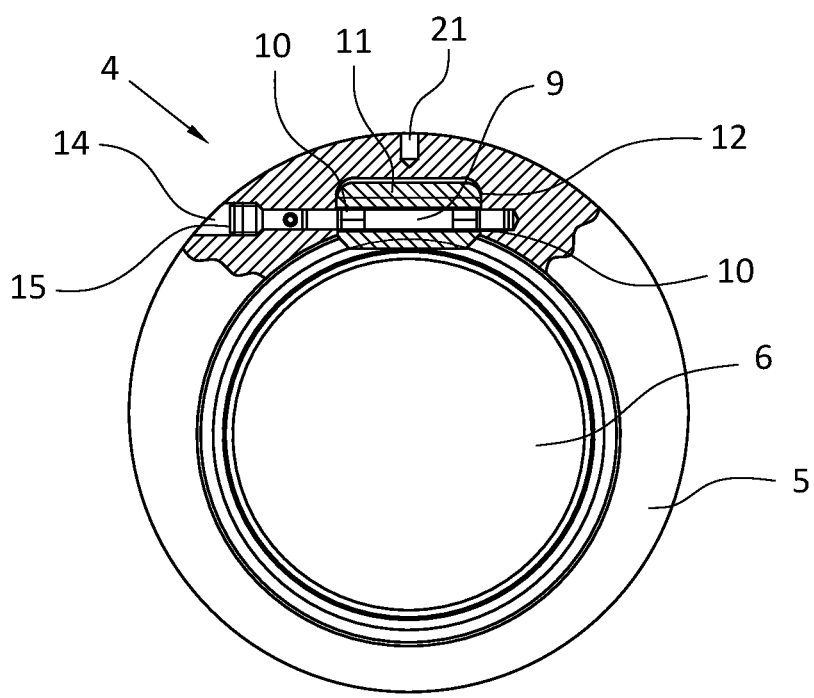
FIG. 5 schematically represents a cross-section through the body of the valve according to line I-I in FIG. 2.

In a preferred embodiment according to the present invention and as illustrated for example in FIG. 5, the check valve 4 comprises two bearings 10 mounted within the hollow tube, spaced apart from one another, said at least two bearings 10 being preferably mounted on said shaft 9, and within the hollow tube.

Such a layout ensures an even more robust structure. At the same time, depending on the diameter of the check valve 4, standard components can be used.

In the context of the present invention, spaced apart from one another should be understood as at a distance greater than zero from one another.

In the context of the present invention, it should be understood that more than two bearings 10 can be mounted on said shaft 9, such as for example and not limiting to three, four or even more, depending on the type of bearings the manufacturer would prefer to use and possibly the diameter and the pressures the check valve 4 is designed to withstand.

In another embodiment according to the present invention, said two bearings 10 are mounted at the extremities of the hollow tube.

Preferably, the valve body 5 comprises a recess 12 for receiving the elongated area 11 therein, as illustrated at least in FIG. 2, and FIG. 5.

In a preferred embodiment according to the present invention, but not limiting thereto, the at least two bearings 10 are mounted in direct contact with said valve body 5, creating therefore a very strong structural connection.

The shaft 9 is preferably inserted into the elongated area and the at least two bearings 10 are being received thereon.

Figure 8:
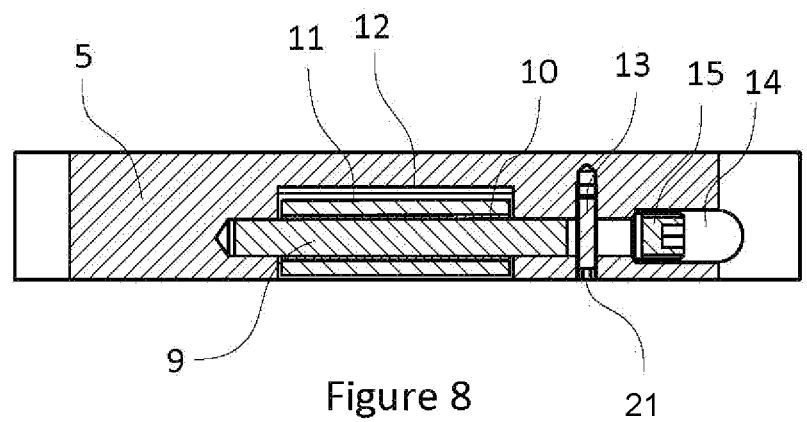
FIG. 8 schematically represents a cross-section through the elongated area of the valve plate and through the valve body, according to line III-III in FIG. 2.

Further preferably, for a more stable and reliable connection, the shaft 9 extends within the valve body 5 over a minimum distance, at both its ends, as illustrated in FIG. 8.

In another embodiment according to the present invention, the check valve assembly 4 further comprises a locking pin 13 mounted through the valve body 5, for securing the shaft into said valve body 5. It goes without saying that, as long as the locking pin 13 is in place and the check valve assembly 4 is functioning in nominal parameters, the shaft 9 cannot be un-mounted.

Said locking pin 13 can be any type of blocking mechanism such as for example and not limiting to: a screw, a bolt, a glue or a seal inserted in a cavity, or the like, said cavity being relatively perpendicular on the shaft 9, or under an angle with respect to the shaft 9.

For ease of mounting, the valve body 5 preferably comprises an orifice 14 through a lateral wall, though which the shaft 9 is slid into its final position.

For creating a fluid tight check valve assembly 4, such that no leakage of compressed air towards the outside environment is encountered, after the locking pin 13 is mounted, a sealing plug 15 is attached onto the orifice 14. Another sealing plug 21 is preferably mounted onto the orifice receiving the locking pin 13.

In another preferred embodiment according to the present invention, the valve plate 6 is adapted to be mounted eccentrically in the valve body 5.

In the context of the present invention eccentrically should be understood as follows: the central point of the valve plate 6, preferably determined by virtually excluding the elongated area 11, case in which the contour valve plate 6 defines a circle, said central point is positioned in a different location than the central point of the valve body 5. Or, in case the check valve assembly has a different shape, eccentrically should be understood as: the valve plate 6 is not received centrally within the valve body 5.

Tests have shown that, because the valve plate 6 and the valve body 5 are located eccentrically, the check valve 4 according to the present invention can open further than standard valves. This translates into a very small pressure drop between the pressure measured within the first fluid conduit 7 and the pressure measured within the second fluid conduit 8.

Consequently, standard pipe dimensions can be used for the first and second fluid conduits 7 and 8, without the need of mounting pipes of a larger diameter and without the need of using a collector unit for achieving such a small pressure drop.

In a preferred embodiment according to the present invention, the valve body 5 further comprises a seat 16 for receiving said valve plate 6, said seat 16 having a near seat portion, H1, in the vicinity where said elongated area 11 is mounted, and a far seat portion, H2, on the opposite side from where said elongated area 11 is mounted, as illustrated in FIG. 6.

In the context of the present invention it should be understood that said seat 16 is a continuous structure along the surface of the valve body 5, receiving the valve plate 6 on its entire circumference.

For an even more reinforced structure, said valve plate 6 can comprise a thicker structure on its exterior circumference where said valve plate 6 enters in contact with the seat 16, said structure being in the shape of a flange or a rim.

Preferably, the valve plate 6 is adapted to be received on said seat 16 under an angle α with respect to a horizontal plane AA', said angle α being created due to the difference between the far seat portion H2, and the near seat portion H1.

Figure 7:
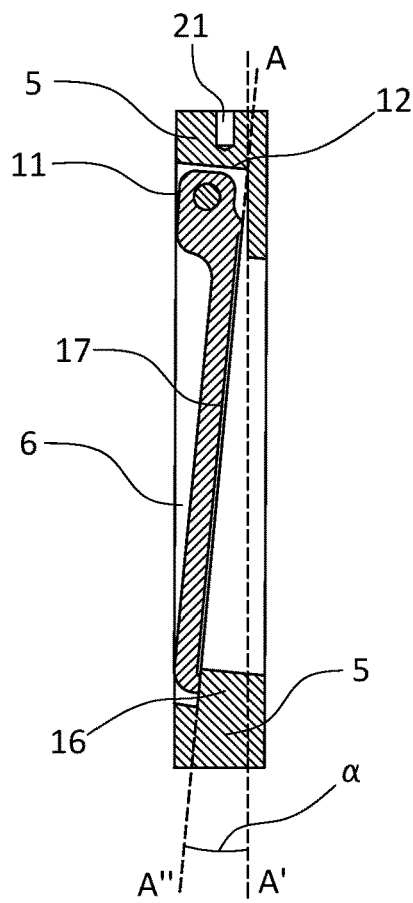
FIG. 7 schematically illustrates a cross-section through the body of the valve and the valve plate according to line II-II in FIG. 2.

As can be seen in FIG. 7, the angle α has been determined by drawing a vertical line AA', from the lowest point of the seat 16, corresponding to the corner of the recess 12, and intersecting that line with a line AA" drawn as a continuation of the edge 17 of the valve plate 6, said edge 17 being brought in direct contact with the seat 16 when the valve plate 6 is in a second closed position.

In other words, if we were to consider that flange F determines a plane FF that is relatively vertical during a normal operation of the check valve 4, and edge 17 determines a plane HH, the angle α is defined as the angle between the plane FF and HH, at the intersection of these two planes, as shown in FIG. 6.

In a preferred embodiment according to the present invention, said angle α can be between more than 0° and 20°, more preferably between 5° and 10°, even more preferably, said angle α is selected to be of approximately 5°.

Tests have shown that, due to the creation of such an angle α, the valve plate 6 closes automatically under the effect of gravity.

In another preferred embodiment according to the present invention, but not limiting thereto, the valve plate 6 is adapted to be mounted eccentrically with respect to the valve body 5 and at the same time, the valve seat 16 creates the angle α of approximately 5°, as defined above.

In such a case, the opening angle of the valve plate 6 with respect to the horizontal line AA' is of approximately 58°. Consequently, a very low pressure drop over the check valve 4 is maintained, while at the same time said check valve 4 is robust and reliable.

In another embodiment according to the present invention, the valve body 5 further comprises a channel 21 provided along an exterior surface for locking said valve body 5 within the first fluid conduit 7.

Accordingly, when mounted, the channel falls within a split pen type of structure positioned on the inner surface of the first fluid conduit 7, locking the valve body 5 within the first fluid conduit 7 in the correct position. Consequently, the check valve assembly 4 cannot be mounted in a rotated position and it can also not rotate during its functioning.

Figure 9:
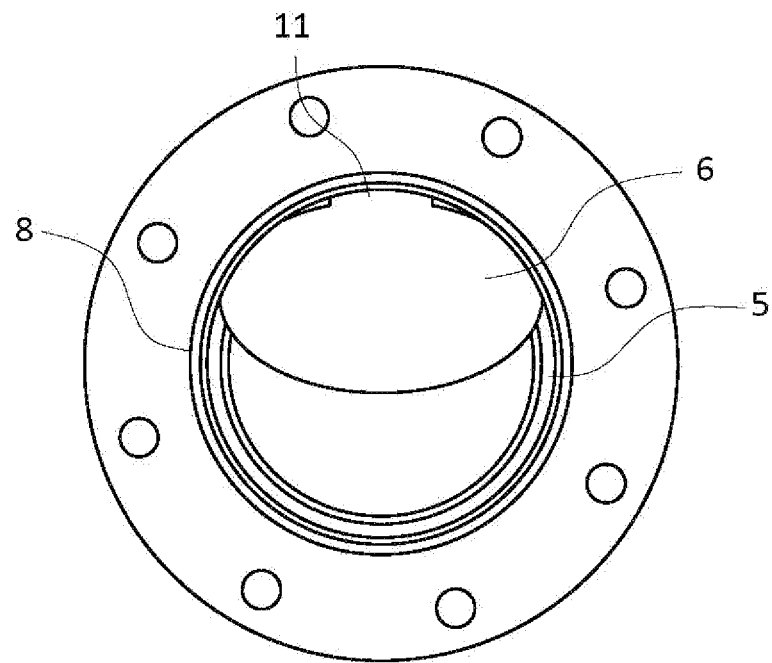
FIG. 9 schematically represents a front view of a valve mounted within a fluid conduit, according to an embodiment of the present invention.

In FIG. 9, a view of a mounted check valve assembly according to the present invention is illustrated. Said view being chosen to be perpendicular on the second fluid conduit 8, in case said check valve assembly 4 is mounted at the discharge port of a compressor unit 1. In this example, the valve plate 6 is in open position and fluid is allowed to flow from the first fluid conduit 7 to said second fluid conduit 8 and further to the external network 2.

In case illustrated in FIG. 11, when said check valve assembly is mounted at the intake port 300 of a vacuum pump 100, the view from FIG. 9 is being chosen to be perpendicular on the first fluid conduit 7. In such a case, the valve plate 6 is in open position and fluid is allowed to flow from the second fluid conduit 8 and therefore from the external network 2, into the first fluid conduit 7 and into the intake port 300 of the vacuum pump 100. The present invention is further directed to a use of a check valve 4 according to the present invention in controlling the flow of fluid at the discharge port 3 of a compressor unit 1 as shown in FIG. 1 or at the intake port 300 of a vacuum pump 100, as shown in FIG. 11.

Figure 10:
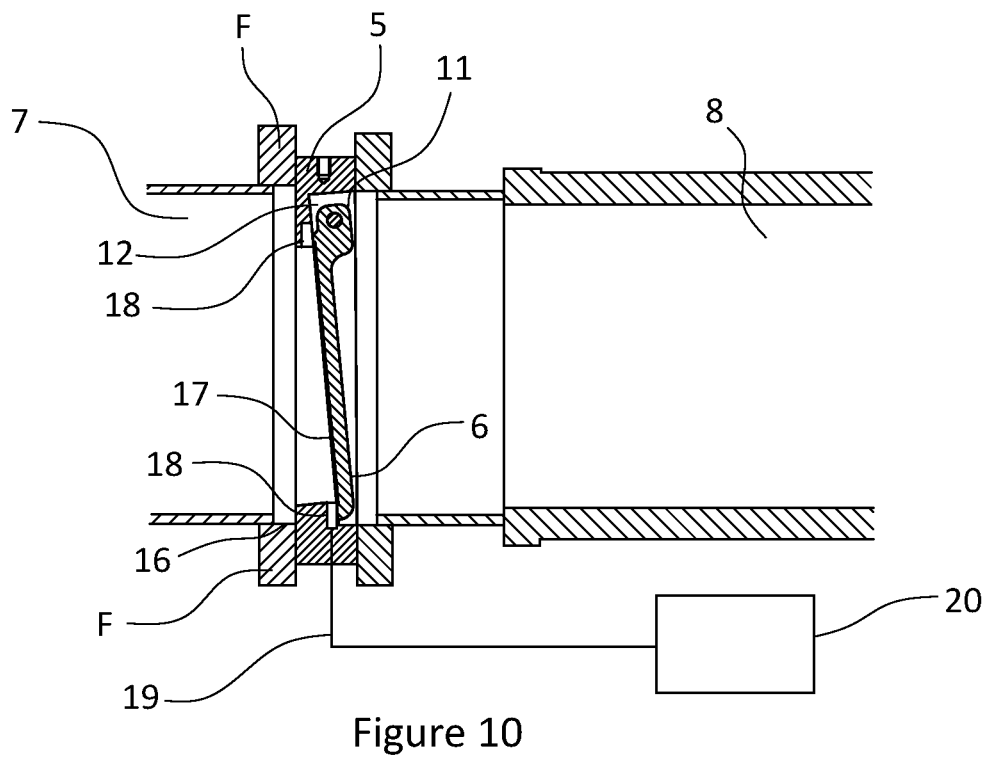
FIG. 10 schematically represents a cross-section of a check valve assembly mounted within a fluid conduit according to another embodiment of the present invention.

In another embodiment according to the present invention, the check valve assembly can comprise a magnet 18, mounted on the seat 16 or within a recess created in the seat 16, such that the valve plate 6 comes in direct contact with said magnet 18 when the check valve 4 is in the second closed position, as illustrated in FIG. 10.

The magnet 18 is preferably connected through an electrical connection 19 to an electrical circuit 20.

Preferably, when the compressor unit 1 or vacuum pump 100 is switched off, the magnet 18 is charged by the electronic circuit 20 by allowing an electrical current to flow through said electrical connection 19, such that the check valve 4 is maintained in a second closed position.

When the compressor unit 1 or vacuum pump 100 is switched on, the electrical circuit 20 stops the electrical current through said electrical connection 19, such that the magnet 18 becomes de-energized and the check valve 4 can pivot into a first open position when the pressure within the first fluid conduit 7 is higher than the pressure within the second fluid conduit 8 in case of a compressor unit 1, or when the pressure within said first fluid conduit 7 is lower than the pressure within the second fluid conduit 8 in the case of a vacuum pump 100.

The functioning principle is very simple and as follows.

When the system is started, the valve plate 6 is in a second closed position.

In case the check valve assembly is mounted at the discharge port 3 of a compressor unit 1, as shown in FIG. 1, after the compressor element starts to function and when the pressure measured within the first fluid conduit 7 is higher than the pressure measured within the second fluid conduit 8, the valve plate 6 pivots between a second closed position and a first open position until the two pressures measured within said first and second fluid conduits 7 and 8 are relatively equal.

On the other hand, if said check valve assembly 4 is mounted at the intake port 300 of a vacuum pump 100, as shown in FIG. 11, after the vacuum pump element starts to function and when the pressure measured within the first fluid conduit 7 is lower than the pressure measured within the second fluid conduit 8, the valve plate 6 pivots between a second closed position and a first open position until the two pressures measured within said first and second fluid conduits 7 and 8 are relatively equal.

In the context of the present invention it should be understood that said valve plate 6 can change its opening angle continuously, according to the double arrow shown in FIG. 6 or FIG. 12, depending on the pressure difference between the pressure measured within the first fluid conduit 7 and the pressure measured within the second fluid conduit 8, and therefore is not limited to only two positions: the first open position and the second closed position, any intermediary opening angle is possible.

If sudden changes in demand at the external network 2 are encountered, changes that would make the pressure measured within the second fluid conduit 8 to be higher than the pressure measured within the first fluid conduit 7 in the case of a compressor unit 1 and according to the embodiment illustrated in FIG. 6, the valve plate 6 pivots from a first open position to a second closed position.

Similarly, if said sudden changes in demand at the external network 2 would determine that the pressure measured within the first fluid conduit 7 to be higher than the pressure measured within the second fluid conduit 8 in the case of a vacuum pump 100 and according to the embodiment illustrated in FIG. 12, the valve plate 6 pivots from a first open position to a second closed position.

Consequently, the check valve assembly 4 according to the present invention acts as a non-return valve.

In another embodiment according to the present invention, a dryer (not shown) can be mounted downstream from the compressor unit 1 within the layout of FIG. 1, between the check valve assembly 4 and the inlet 3 of the compressor unit 1.

The structure, components and functionality of the check valve assembly 4 in such a case, preferably remains the same as for a check valve assembly 4 mounted within a compressor unit 1 and described within the present paper. The present invention is by no means limited to the embodiments described as an example and shown in the drawings, but such a check valve assembly 4 can be realized in all kinds of variants, without departing from the scope of the invention.

The invention claimed is:

1. A check valve assembly configured to be mounted at the interface between a compressor unit or a vacuum pump and an external network, for preventing a fluid flow in the upstream direction, the check valve assembly comprising:
a valve body comprising a through bore provided only along a top portion of a periphery of the valve body;
a valve plate connected eccentrically to the valve body, said valve plate configured in a way such that the valve plate pivots between a first open position in which fluid is able to flow through said check valve assembly and a second closed position in which fluid cannot flow through said check valve assembly;
said valve body being adapted to be connected to a discharge port of the compressor unit or to an intake port of the vacuum pump through a first fluid conduit;
a second fluid conduit attachable to the valve body, said second fluid conduit being adapted to be connected to the external network;
a shaft and at least one bearing provided in the through bore of the valve plate; and
an orifice provided through a lateral wall along a periphery of the top portion of the valve body,
wherein the valve plate comprises an elongated area having a hollow tube,
wherein the shaft is slid through the orifice and completely inserted in the hollow tube of the valve plate and the through bore of the valve body for rotatably mounting said valve plate in the valve body,
wherein said at least one bearing is positioned on said shaft and within said hollow tube, and said at least one bearing is in direct contact with said valve body,
wherein said valve body further comprises a seat that receives said valve plate, said seat having a near seat portion in the vicinity where said elongated area is mounted, and a far seat portion on the opposite side from where said elongated area is mounted,
wherein a sealing plug is attached in the orifice, and
wherein a locking pin is positioned between the shaft and the sealing plug, and the locking pin is not coaxial with the shaft.

2. The check valve assembly according to claim 1, wherein the check valve assembly comprises two bearings mounted within the hollow tube, spaced apart from one another.

3. The check valve assembly according to claim 2, wherein said two bearings are mounted at ends of the hollow tube.

4. The check valve assembly according to claim 1, wherein the valve plate is adapted to be received on said seat under an angle with respect to a vertical plane, said angle being created due to the difference between the far seat portion and the near seat portion.

5. The check valve assembly according to claim 4, wherein said angle is of at least 5 degrees.

6. The check valve assembly according to claim 1, wherein the valve body comprises a recess that corresponds to the elongated area and receives the elongated area therein.

7. The check valve assembly according to claim 1, wherein the locking pin is mounted through the valve body.

8. The check valve assembly according to claim 1, wherein the valve body further comprises a channel provided along an exterior surface for locking said valve body within the first fluid conduit.

9. The check valve assembly according to claim 1, further comprising a magnet mounted on the seat or a recess in the seat.

10. A compressor unit comprising a check valve assembly according to claim 1 attached to a discharge port of the compressor unit.

11. A check valve assembly comprising
a valve body comprising a through bore provided only along a top portion of a periphery of the valve body,
a valve plate mounted eccentrically in the valve body by a shaft that extends through said bore, wherein each end of the shaft extends into the valve body, and
two bearings on said shaft, and at least one of said two bearings is in direct contact with said valve body,
wherein said check valve assembly is configured to be mounted at interface between a compressor unit or a vacuum pump and an external network, for preventing fluid flow in an upstream direction, and wherein an orifice provided through a lateral wall along the top portion of the periphery of the valve body, and a sealing plug is attached in the orifice, and wherein a locking pin is positioned between the shaft and the sealing plug, and the locking pin is not coaxial with the shaft.

12. The check valve assembly according to claim 11, wherein the valve plate is adapted to be received on a seat under an angle with respect to a vertical plane, said angle being created due to the difference between a far seat portion and a near seat portion.

13. The check valve assembly according to claim 12, wherein said angle is between 5 degrees and 10 degrees.

14. The check valve assembly according to claim 13, further comprising a magnet that is configured to be electrically charged whereby said magnet holds the check valve in a closed position.

15. A check valve assembly configured to be mounted at the interface between a compressor unit or a vacuum pump and an external network, for preventing a fluid flow in the upstream direction, the check valve assembly comprising:

a valve body comprising a through bore provided only along a top portion of a periphery of the valve body;

a valve plate connected eccentrically to the valve body, said valve plate configured in a way such that the valve plate pivots between a first open position in which fluid is able to flow through said check valve assembly and a second closed position in which fluid cannot flow through said check valve assembly;

said valve body being adapted to be connected to a discharge port of the compressor unit or to an intake port of the vacuum pump through a first fluid conduit;

a second fluid conduit attachable to the valve body, said second fluid conduit being adapted to be connected to the external network;

a shaft and at least one bearing provided in the through bore of the valve plate; and an orifice provided through a lateral wall along a periphery of the top portion of the valve body, wherein the valve plate comprises an elongated area having a hollow tube, wherein the shaft is slid through the orifice and completely inserted in the hollow tube of the valve plate and the through bore of the valve body for rotatably mounting said valve plate in the valve body, wherein said at least one bearing is positioned on said shaft and within said hollow tube, and said at least one bearing is in direct contact with said valve body, wherein said valve body further comprises a seat that receives said valve plate, said seat having a near seat portion in the vicinity where said elongated area is mounted, and a far seat portion on the opposite side from where said elongated area is mounted, further comprising a magnet mounted on the seat or a recess in the seat, wherein the magnet is connected to an electrical circuit, wherein when the compressor unit or the vacuum pump is switched off, the magnet is charged by the electrical circuit such that the check valve assembly is maintained in a closed position, and when the compressor unit or the vacuum pump is switched on, the magnet is de-energized such that the check valve assembly is able to pivot based on the fluid flow, wherein a sealing plug is attached in the orifice, and wherein a locking pin is positioned between the shaft and the sealing plug, and the locking pin is not coaxial with the shaft.

* * * * *